United States Patent [19]

Bigot et al.

[11] 4,350,671

[45] Sep. 21, 1982

[54] METHOD OF PREPARING PHOSPHORIC ACID BY A WET PROCESS

[75] Inventors: Bernard Bigot, La Londe; Jean-François Gielly, Rouen, both of France

[73] Assignee: Rhone-Poulenc Industries, Paris, France

[21] Appl. No.: 199,645

[22] Filed: Oct. 22, 1980

[30] Foreign Application Priority Data

Oct. 31, 1979 [FR] France ............................... 79 26993

[51] Int. Cl.$^3$ .............................................. C01B 25/16
[52] U.S. Cl. ..................................... 423/320; 423/167
[58] Field of Search ...................... 423/319, 320, 167

[56] References Cited

U.S. PATENT DOCUMENTS

| | | | |
|---|---|---|---|
| 2,950,171 | 8/1960 | Macq | 423/320 |
| 3,418,077 | 12/1968 | Robinson | 423/320 |
| 3,755,539 | 8/1973 | Bigot | 423/320 |
| 4,029,743 | 6/1977 | Hauge | 423/320 |

FOREIGN PATENT DOCUMENTS 2130847 11/1972 France .

*Primary Examiner*—Earl C. Thomas
*Assistant Examiner*—Gregory A. Heller
*Attorney, Agent, or Firm*—Finnegan, Henderson, Farabow, Garrett & Dunner

[57] ABSTRACT

Phosphoric acid is produced by a wet process in a homogeneous medium from calcium phosphate ore, sulphuric acid and a continuously added aqueous solution of recycled acid.

Part of the phosphate is treated in a primary reaction medium, prepared separately and differing in composition from the final medium sought. By regulating the compositions of the various reaction media, the present process advantageously increases the concentration of the phosphoric acid produced and/or enhances the quality of filtration, along with other advantages.

The process can advantageously be applied for the economic treatment of low-grade, poorly reactive or unground phosphates.

9 Claims, No Drawings

METHOD OF PREPARING PHOSPHORIC ACID BY A WET PROCESS

The present invention relates to the production of phosphoric acid from phosphates by a wet process.

On an industrial scale, considerable progress has been made in the manufacture of phosphoric acid from phosphates by a wet process involving use of the homogeneous attack reactor described in U.S. Pat. No. 2,950,171, the disclosure of which is specifically incorporated by reference herein. As is known, the main operating parameters in the attack of phosphates are the $P_2O_5$ and $SO_4^{--}$ concentrations in the reaction medium, the solid materials content and the temperature. These parameters are interdependent; as soon as one is fixed, the operating range of the others is limited. Usually, there is an optimum value for each of the parameters in attacking a given phosphate.

Thus, stability of the operation and accurate control of the parameters are of prime importance for a satisfactory attack of the phosphate. The process described in U.S. Pat. No. 2,950,171 satisfies the demands for shaping and growing crystals in a single homogeneous medium and also provides for stability of operation and precise control of the operating parameters.

Continued research, utilizing the advantages of the homogeneous reactor described in U.S. Pat. No. 2,950,171, has succeeded in resolving certain problems involved with the processing of certain phosphate ores. For example, the process described in U.S. Pat. No. 3,755,539, which is aimed at obtaining a very high rate of attack, the disclosure of which is specifically incorporated by reference herein, and the process described in French Pat. No. 2,130,847, aimed at achieving a very high concentration of $P_2O_5$, obtain results which, in the prior art, were attained only by troublesome processes involving successive double crystallization.

Pursuing our research, we have now perfected a general method for achieving a number of objectives heretofore unobtainable because they required contradictory operating parameters.

Specifically, the method of the present invention allows achievement of (1) an increased concentration of the phosphoric acid produced, thus effecting savings of energy; (2) a high attack efficiency or yield; (3) a satisfactory rate of crystallization resulting in good filtration; and (4) retention of stability of operation by using a homogeneous reactor. Further, the method can be modified to selectively emphasize a particularly desired result, such as a high attack yield.

Further, the method allows treatment of phosphates which presently result in slurries of mediocre quality for filtration and are thus currently deemed undesirable for the production of phosphoric acid. Specifically, the method of the present invention can be used to treat low filter phosphates, poorly-reactive phosphates, and poorly crushed and/or uncrushed phosphates.

In accordance with the aforesaid wet process techniques, reaction is carried out in a homogeneous reaction medium of calcium phosphate and sulphuric acid in the presence of dilute phosphoric acid. The sulphuric acid and phosphoric acid attack the phosphate to form calcium sulphate (gypsum) and more phosphoric acid. Specifically, the calcium phosphate dissolves in phosphoric acid to give monocalcium phosphate in solution:

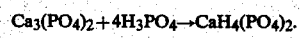

Monocalcium phosphate then reacts immediately with the $H_2SO_4$ mixed with $H_3PO_4$:

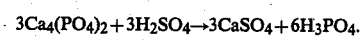

According to the improvement which is the object of the present invention, two reaction media are employed. A primary attack slurry containing phosphoric acid and calcium sulphate (gypsum) products is formed separately from a primary reaction medium containing reagents comprising calcium phosphate to be treated, sulfuric acid ($SO_4^{--}$) and a continuously-supplied recycled flux containing dilute phosphoric acid ($P_2O_5$).

A final reaction medium contains sulphuric acid ($SO_4^{--}$) in a quantity which is at most equal to the quantity needed to attack the phosphate; 3 to 50% by weight of the total calcium phosphate to be treated; a continuously-supplied recycled flux containing dilute phosphoric acid ($P_2O_5$) in a quantity below the quantity necessary for the phosphate present; and the separately formed primary attack slurry, which is combined with the other reagents to form the final reaction medium. Calcium sulphate (gypsum) and phosphoric acid products are produced in the final reaction medium. After reaction occurs in the final reaction medium, the solid calcium sulphate and the liquid phosphoric acid products are separated from each other, preferably by filtration.

The dilute phosphoric acid is continuously supplied separately to both the primary and final media by liquids used for washing, referred to as "process water". Those liquids originate from separation of the solid reaction product, calcium sulphate (gypsum), from the liquid reaction product, phosphoric acid, after reaction has occurred in the final medium. The process water thus acts as a recycled flux and forms part of both reaction media.

The operating parameters of the final reaction medium differ from those of the primary medium, as will be explained in greater detail hereafter. Preferably, the primary attack slurry is formed in a primary homogeneous reactor and the final medium is contained in a final homogeneous reactor. The primary reactor and the final reactor are preferably connected in series.

Significantly, the good properties imparted to the primary attack slurry by the combination of the parameters in the primary medium are retained in the final slurry. The method of the present invention is therefore very flexible and facilitates the economical processing of phosphates of various origins and of limited levels of grinding.

Preferably, the primary attack slurry is prepared in a homogeneous reactor by introducing therein the reagents in such a proportion that the concentration of $P_2O_5$ obtained therein is 1 to 8% less than the $P_2O_5$ concentration in the final slurry. Because of the lower concentration of $P_2O_5$ in the primary reaction medium, compact calcium sulphate crystals are formed which are readily separated from the phosphoric acid during subsequent separation, such as that effected by filtration. The desired $P_2O_5$ concentration in the primary reaction medium may be attained by adding thereto the major part of the recycled flux.

The maintenance of a lower concentration of $P_2O_5$ in the first tank makes it possible to use crude phosphates or even phosphates in which only the very largest particles have been reground.

Unexpectedly, moreover, the favorable crystallization of the calcium sulphate formed in the primary attack slurry is retained as new reagents are introduced and as new reagents are introduced during the course of reaction in the final reaction medium, wherein the $P_2O_5$ concentration is higher and thus less favorable to crystallization.

Because of the favorable crystallization conditions in the primary reaction medium, it has been found advantageous to process therein the major part of the phosphate.

In the primary attack medium, the rate of $SO_4^{--}$ in solution is regulated by introducing therein a quantity of sulphuric acid at least equal to the quantity necessary to attack the phosphate introduced. Importantly, however, the quantity of sulphuric acid must not rise to the level that phosphate attack is blocked (the well-known phenomenon of the coating of the phosphate grains by reduction of the solubility of the sulphates), which phenomenon increases losses of $P_2O_5$.

The quantity of sulphuric acid to be introduced will vary according to the phosphate ore to be treated and can be readily determined without undue experimentation. An optimum concentration value is a function of the reactivity of the phosphate, its specific surface, its size distribution and the retention time required. Further, it is also known that a high rate of $SO_4^{--}$ reduces the amount of syncrystallized $P_2O_5$, which results from the substitution of sulphate ions by phosphate ions in the lattice of the gypsum (calcium sulphate) crystals, and increases both the rate of reaction and the quality of filtration. As mentioned above, however, if the concentration of $SO_4^{--}$ is too high, phosphate attack will be blocked.

In accordance with the present invention, it has been found that the high attack efficiency obtained by reason of the choice of the level of $SO_4^{--}$ in the primary reaction medium is retained in the final reaction medium. Therefore, it is advantageous to process the major part of the phosphate in the primary reaction medium.

Advantageously, the present invention can be utilized to process phosphates which differ by reason of their origin, their properties and their degree of grinding. It is thus possible to prepare the primary reaction medium by using a phosphate ore in which the $P_2O_5$ concentration is less than that of the ore used in the final reactor or by using a phosphate ore having an entirely different size distribution from that of the ore in the final reactor.

In an advantageous alternative embodiment of the process of the present invention, the primary attack slurry is prepared by combining two attack slurries prepared in two homogeneous reactors placed in series. As in the embodiment wherein the primary attack slurry is prepared in a single primary reactor, the infeed of reagents makes it possible to regulate the desired $P_2O_5$ and $SO_4^{--}$ concentrations in the reaction media.

In this alternative embodiment, the reagents are distributed in such a way that the $P_2O_5$ concentration increases from one reactor to the next in the series, while the level of $SO_4^{--}$ remains the same or preferably decreases from one reactor to the following reactor.

Thus, use of more than two reactors would not depart from the scope of the invention. In the various embodiments of the invention, one skilled in the art can regulate the other parameters such as the levels of solids, the temperature, etc., in the various reactors without undue experimentation.

Generally, the phosphate is attacked in such a way as to result in calcium sulphate in a dihydrate form; however, the advantages of the process according to the invention would still be enjoyed if a different method of attack, such as production of a hemihydrate form, is utilized.

The process according to the invention may be carried out using any homogeneous reactor. Preferably, the reactor disclosed in U.S. Pat. No. 2,950,171, which is equipped with suitable agitating means, is used. If additional agitating means are desired, the surface agitators described in U.S. Pat. No. 4,199,557 are preferably employed. In such a reactor, the mixture is cooled by the passage of air. The cooling air may be treated by any known cleansing method.

The reaction products, the phosphoric acid and the solid may be separated by any known means which allow washing. Preferably, separation is accomplished by using the filtration described in U.S. Pat. No. 3,262,574, which facilitates both good washing of the filter cake and good separation of the various filtrates.

In comparison with known processes, the process according to the invention, having a high rate of filtration and employing non-augmented filtration means, can produce an acid which has a higher concentration of $P_2O_5$ and/or an increased attack efficiency, at the expense of a limited modification of the plant.

Further advantages will become evident from the following examples which are given by way of illustration and which imply no limitation of the process of the invention.

EXAMPLE 1

Use is made of the fact that gypsum crystallization is strongly influenced by the $P_2O_5$ concentration in the slurry attack medium. An apparatus is employed which comprises two reactors agitated in series and a horizontal plane filter which rotates in a vacuum, such as is disclosed in U.S. Pat. No. 3,262,574.

70% of the amount of an average commercial phosphate to be treated, a phosphate containing 29 to 31% $P_2O_5$ and having a fineness of 600 microns, is introduced into the first reactor. In known processes, such an average commercial phosphate is capable of producing an acid having no more than 29% $P_2O_5$. 70% of the amount of sulphuric acid is also introduced into the primary reactor. The remaining 30% of both reagents is introduced into the second, or final reactor. The reaction media of the reactors are regulated to have the following compositions:

|  | 1st (Primary) | 2nd (Final) |
|---|---|---|
| $P_2O_5$ % | 28 | 33 |
| $SO_4^{--}$ in g/l | 25 | 25 |

The working temperature is one which will result in the formation of gypsum.

The slurry from the primary reactor, containing crystals of calcium sulphate which provide for very good filtration, are transferred into the second reactor. The quantity of crystals transferred is such that the quality of filtration in the second reactor is not very highly modified in spite of the fact that crystallization conditions are less favorable in the second reactor.

By carrying out 70% of the crystallization in a $P_2O_5$ dilute medium, the yield is improved by approximately half a point over the known process of the prior art.

Further, the acid collected has a concentration (33%) greater than the concentration (28%) of an acid collected in a known process utilizing the same raw materials.

EXAMPLE 2

The same apparatus and the same phosphate are used as in Example 1. 70% of the phosphate to be treated, having a fineness of 400 microns, and 80% of all the sulphuric acid is introduced into the primary reactor. The rest of the phosphate (30%), having a fineness of 600 microns, and the rest of the sulphuric acid (20%) is introduced into the final reactor so that the reaction media have the following compositions:

|  | 1st (Primary) | 2nd (Final) |
|---|---|---|
| $P_2O_5$ | 28 | 33 |
| $SO_4^{--}$ in g/l | 75 | 25 |

The temperature used conforms to that used in a conventional process for the formation of gypsum.

As compared with a known method for producing gypsum, the quality of filtration is more than doubled and the efficiency or yield is improved by one point.

EXAMPLE 3

The same phosphate as used in Examples 1 and 2, having a fineness of 400 microns, is used in an apparatus consisting of three reactors in series and one filter. A high level of $SO_4^{--}$ is chosen in the first two reactors, which is favorable to the reduction of losses of $P_2O_5$ resulting from syncrystallized $P_2O_5$. In other words, this level of $SO_4^{--}$ reduces the substitution of sulphate ions by phosphate ions in the lattice of the gypsum product.

The reagents are distributed as follows in such a way as to have the following reaction media:

|  | 1st | 2nd | 3rd |
|---|---|---|---|
| % phosphate | 70 | 25 | 5 |
| % $H_2SO_4$ | 80 | 20 | — |
| $P_2O_5$ % | 28 | 32 | 33 |
| $SO_4^{--}$ in g/l | 75 | 50 | 25 |

Compared with a known method providing 97% efficiency, the filtration capacity of this test is more than doubled and the efficiency is improved by 1.3 to 1.5 points. As this result is obtained without increasing the sulphuric acid content in the acid produced, the concentration of the latter is increased from 28 to 33% $P_2O_5$ by the process of the invention.

EXAMPLE 4

A calcined American phosphate containing 31 to 32% $P_2O_5$ which has mediocre filtration properties is processed (a) in accordance with the process of the invention to produce a dihydrate; and (b) in accordance with a known dihydrate process. The process according to the invention can be utilized either (1) to obtain the same filtration capacity, but an increased $P_2O_5$ concentration (3 points greater) over the $P_2O_5$ concentration obtained in a known process, or (2) to obtain the same concentration of acid product, but an increased (1.5 times) filtration capacity in comparison with the capacity obtained by a known process.

EXAMPLE 5

A non-crushed, calcined American phosphate, containing 28 to 29% $P_2O_5$, and being slightly reactive and thus of a type generally regarded as unfavorable in terms of filtration, is processed.

Treated by a conventional gypsum process, with a 97% attack efficiency, one can only obtain an acid of a concentration of the order of 27% $P_2O_5$ on a filter of reasonable size. Any increase in concentration of the acid produced by one or two points would require a substantial 25 to 35% increase in the filtration area.

Without modifying the filter, the process of the invention makes it possible, using two reactors in series, to produce an acid containing 30% $P_2O_5$ with a 97.8% level of efficiency.

We claim:

1. A method of preparing phosphoric acid by a wet process from calcium phosphate and sulphuric acid in the presence of dilute phosphoric acid in a homogeneous reaction medium comprising the steps of:
   (a) forming separately a primary attack slurry containing phosphoric acid and calcium sulphate products, said primary attack slurry being formed from a primary reaction medium containing reagents comprising:
      (i) calcium phosphate to be treated;
      (ii) sulphuric acid, said sulphuric acid being added in a quantity at least equal to the quantity necessary to convert the phosphate present to phosphoric acid but less than the quantity which results in blocking the phosphate conversion, and
      (iii) a continuously-supplied recycle flux containing dilute phosphoric acid ($P_2O_5$);
   (b) forming a final reaction medium to produce phosphoric acid and calcium sulphate products, said final reaction medium differing in composition from said primary attack slurry and comprising;
      (i) from 3 to 50% of the calcium phosphate to be treated;
      (ii) sulphuric acid in a quantity at most equal to the quantity needed to convert the phosphate to phosphoric acid;
      (iii) a continuously-supplied recycled flux containing dilute phosphoric acid ($P_2O_5$), said recycled flux being introduced in a quantity less than the quantity necessary to convert calcium phosphate to monocalcium phosphate in solution; and
      (iv) the separately formed primary attack slurry, said primary attack slurry having a $P_2O_5$ concentration 1 to 8% less than the $P_2O_5$ concentration in said final reaction medium; and
   (c) separating the phosphoric acid product from the solid calcium sulfate product.

2. The process of claim 1 wherein the major part of the recycled flux containing dilute phosphoric acid is continuously supplied to the primary reaction medium to crystallize calcium sulphate.

3. The process of claim 1 wherein the calcium phosphate treated in the primary reaction medium lacks identity and grinding source with the calcium phosphate which is treated in the final medium.

4. The process of claim 1 wherein at least a part of the phosphate to be treated is a crude natural phosphate.

5. The process of claim 1 wherein at least a part of the phosphate to be treated contains particles that have been ground.

6. The process of claim 1 wherein the primary attack slurry is prepared by distributing the reagents over a plurality of homogeneous reactors in series.

7. The process of claim 6 wherein the reagents are distributed in such a way that the phosphoric acid ($P_2O_5$) concentration steadily increases from one reactor to the next reactor in the series.

8. The process of claim 6 wherein the reagents are distributed in such a way that the level of sulphuric acid in solution is not greater from one reactor to the next reactor in the series.

9. The process of claim 1 wherein the recycled fluxes originate from washing of the solid product by process water.

* * * * *